United States Patent [19]
Beach et al.

[11] 3,812,966
[45] May 28, 1974

[54] SETTLING RATE TESTER

[75] Inventors: William A. Beach, Milltown; Richard M. Schlauch, Yardville, both of N.J.

[73] Assignee: Sybron Corporation, Rochester, N.Y.

[22] Filed: Mar. 13, 1972

[21] Appl. No.: 234,277

[52] U.S. Cl............ 210/70, 73/61 R, 73/61.4, 73/432 PS, 210/73, 210/84, 210/96, 356/39, 356/246
[51] Int. Cl............................................ B01d 37/04
[58] Field of Search......... 210/521, 522, 96, 70, 73, 210/84, 97; 73/61 R, 61.4, 432 PS; 356/39, 246

[56] References Cited
UNITED STATES PATENTS

| | | | |
|---|---|---|---|
| 2,379,158 | 6/1945 | Kalischer | 73/61.4 |
| 3,142,180 | 7/1964 | Glezen et al. | 73/432 PS |
| 3,144,773 | 8/1964 | Bramel | 73/432 PS |
| 3,482,694 | 12/1969 | Rice et al. | 210/522 X |
| 3,615,025 | 10/1971 | Rice et al. | 210/521 |
| 3,640,387 | 2/1972 | Conley et al. | 210/521 X |
| 3,666,419 | 5/1972 | Cahour et al. | 73/61 R |
| 3,739,180 | 6/1973 | Carlson | 73/432 PS |

OTHER PUBLICATIONS

Permutit Sybron Corporation, Technical Bulletin, "Chevron Tube Settler", Feb. 1971. Vol. 9, No. 2.
Permutit Sybron Corporation, Technical Bulletin, "Chevron tube Settler", May, 1970. Vol. 8, No. 4.

*Primary Examiner*—John Adee
*Assistant Examiner*—Robert H. Spitzer
*Attorney, Agent, or Firm*—Theodore B. Roessel; James A. Rich

[57] ABSTRACT

The settling rate of particulate matter in a fluid is determined by passing a mixture of the fluid and the particulate matter through an inclined tube at a known flow rate within the laminar flow range. Sensors may be used to detect the presence of particles at one or more levels in the tube; and the signals from the sensors may be used to control the operation of a separator.

6 Claims, 3 Drawing Figures

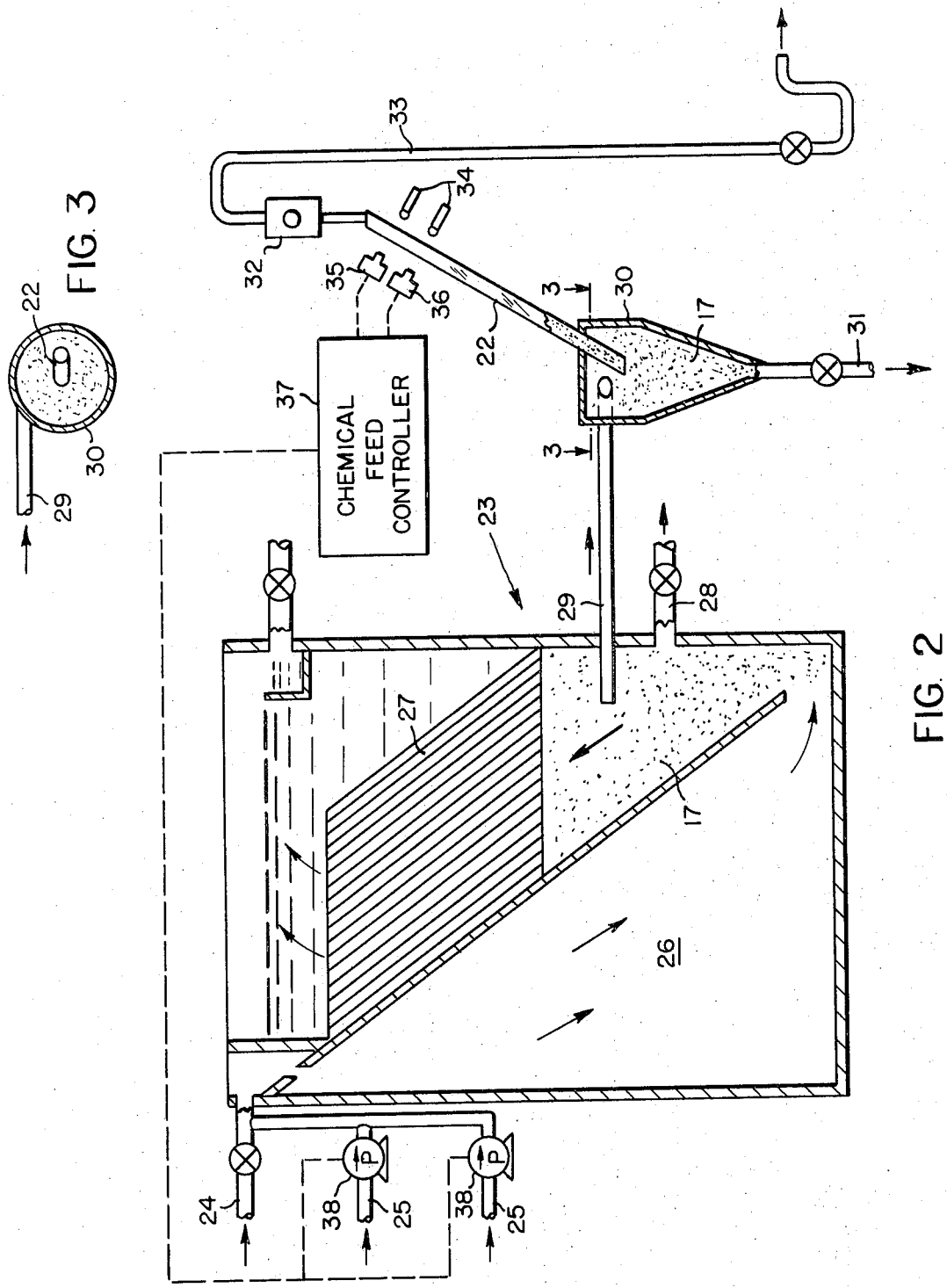

SETTLING RATE TESTER

BACKGROUND OF THE INVENTION

This invention relates to apparatus for determining the settling rate of particulate matter, such as sludge particles, in a fluid.

In many systems for treating waste water or similar fluids, impurities are removed from the fluid in the form of sludge particles which settle out of the fluid as the fluid passes up through a separator. Recently, many of these separators have been equipped with banks of inclined tubes which increase the rate at which fluid can be passed through the separators. Typical examples of these tube settlers are illustrated in U.S. Pat. Nos. 3,482,694 and 3,615,025-Rice et al.; in U.S. Pat. application Ser. No. 39,997, filed May 25, 1970 by J. R. Anderson and W. A. Beach; and in Permutit Technical Bulletins Volume 8 No. 4, May 1970 and Volume 9, No. 2, February 1971.

In the operation of tube settlers and other types of up-flow separators, it is frequently necessary to determine the rate at which sludge particles settle in order to optimize flow rates, pH, the type or amount of coagulants, flocculants or other chemicals to be added and a variety of other operating parameters. Presently, the most common method of determining sludge settling rates is the conventional jar test, in which the waste to be treated and chemicals to be added are mixed in a jar and allowed to stand until the particles have settled out. This method provides a rough estimate of what will happen in the separator, but it leaves many questions unanswered. For example, the jar test does not provide a quantitative measure of the settling rates of the whole spectrum of sludge particles which may be present in the separator; thus, it does not provide a very good picture of what types of particles are likely to cause problems. Another shortcoming of the jar test is that the particles are not subjected to the same settling conditions or hydraulic stresses that are present in the separator. The hydraulic stresses in the separator may fracture weak particles that appear to be excellent in the jar test. Furthermore, the jar test does not reveal how long it will take the particles to begin settling in a tube settler due to turbulent flow conditions at the tube inlets, how readily the settled particles will slide back out of the tubes, or how much the settled particles sliding down the bottom side of the tubes will restrict the flow of fluid up the tubes. Thus, the jar test can only provide a very rough, incomplete picture of what will happen in an actual tube settler.

SUMMARY OF THE INVENTION

It is an object of this invention to provide improved means for determining the settling rate of particulate matter in a fluid.

Another object of this invention is to provide a settling rate tester which accurately simulates the conditions which are present in a tube settler.

A still further object is to provide a tester that minimizes the danger of damage to particles during the test and thereby insures accurate results.

This invention provides a vessel adapted to contain a mixture of the particulate matter and fluid, an inclined tube having its lower end extending into the vessel and its upper end extending above the level of the fluid in the vessel, and means for sucking fluid from the vessel up through the inclined tube at a known flow rate within the laminar flow range. Particulate matter will be carried into the tube with the fluid and will settle out of the fluid as it passes up through the tube. The distance that the particles travel up the tube depends upon the upward velocity of the fluid, the distance the particles have to travel to reach a zone of laminar flow so that actual settling can begin, the vertical distance the particles have to travel to reach the lower side of the tube, and the settling rate of the particles in that particular fluid. Since the vertical distance the particles must travel and the velocity of the fluid are known, the settling rate can be determined by measuring the distance that the particles are carried up the laminar flow zone of the tube.

Since the fluid is sucked up the tube, the possibilities of breaking up the particles or otherwise changing them are minimized. Thus, the conditions which are present in a tube settler can be accurately simulated.

Another object of this invention is to provide apparatus for monitoring the operation of a separator, such as a tube settler. Fluid is withdrawn from the separator and passed through an inclined tube at a flow rate which simulates the flow rate of the fluid through the separator. Sensors, such as photocells, may be provided for detecting particles at one or more levels in the tube and the signals from the sensors may be used to control the separator automatically.

Other objects and advantages of this invention will become apparent from the following description.

DRAWINGS:

FIG. 2 illustrates another embodiment, showing the use of this invention to monitor the operation of an up-flow separator.

FIG. 3 is a cross-sectional view taken along lines 3—3 of FIG. 2.

DETAILED DESCRIPTION

Figure 1:
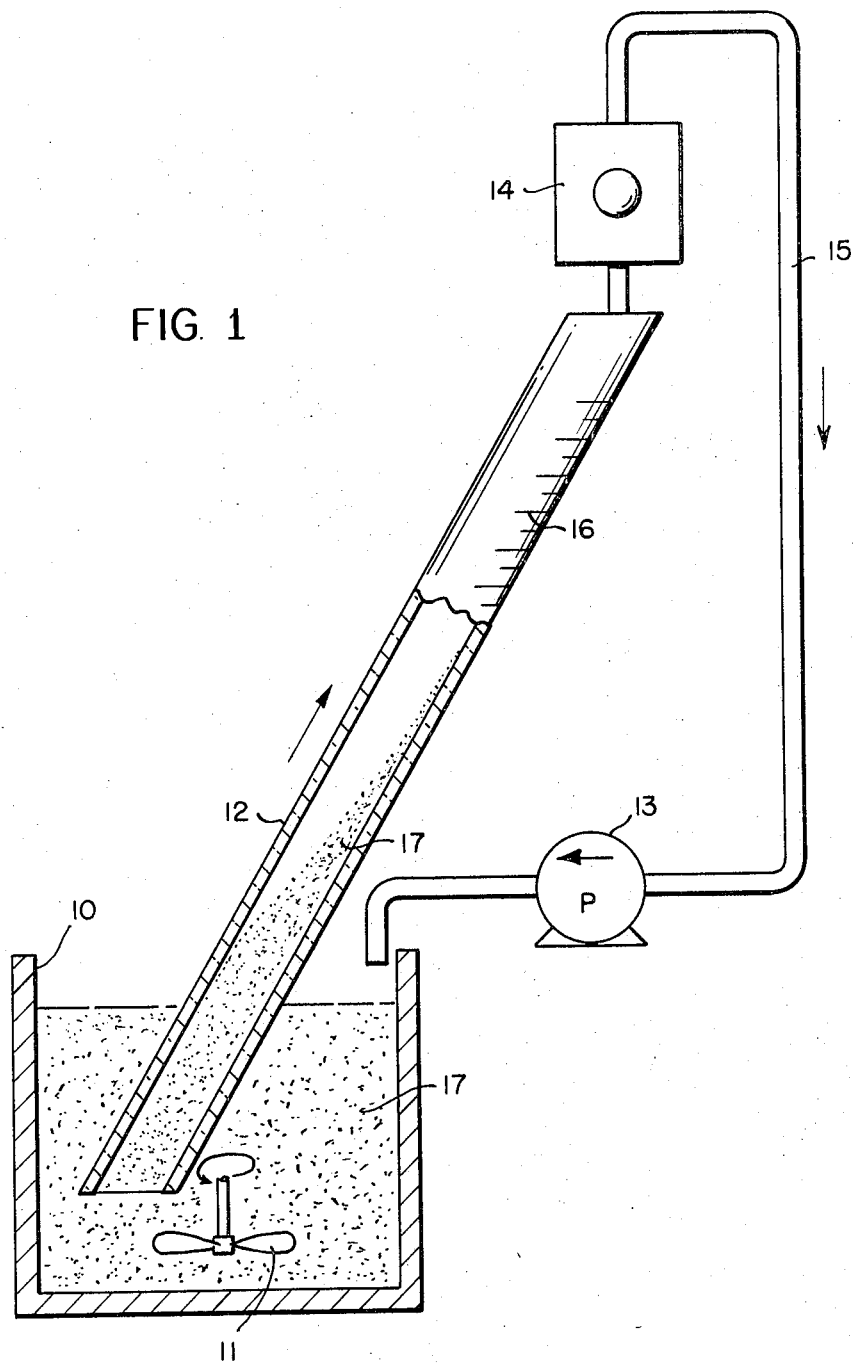
FIG. 1 illustrates one embodiment of this invention.

The embodiment shown in FIG. 1 includes a tank 10 for holding a mixture of fluid and particulate matter 17. A mechanical or magnetic stirrer 11 may be used to agitate the fluid in the tank and insure a uniform distribution of the particulate matter throughout the fluid. The lower end of an inclined tube 12 extends into the fluid within the tank while the upper end extends above the tank. Fluid from the tank is sucked up through the inclined tube 12 by a positive displacement pump 13 such as a tubing pump, hydraulically connected to the upper end of the inclined tube through a rotameter 14 and connecting pipe or tubing 15. The discharge of the pump is returned to the tank. If desired, the fluid may be heated at some point in the cycle to approximately the temperature likely to be encountered in the tube settler.

The fluid passing into the tube will carry with it some of the particulate matter 17 from the tank. As long as the flow through the tube remains within the laminar range, any particles which are heavier than the fluid will gradually settle towards the lower side of the tube as they would in a tube settler. The settling rate for any particular type of particle can be determined from the following equation:

$$U = V \times h/L$$

wherein U equals the settling rate, V equals the velocity of the fluid flowing in the tube, L equals the furthest length along the laminar flow region of the tube traveled by any of the type of particle in question, and h equals the distance from the upper side to the lower side of the tube along a vertical cross-section.

Under most conditions, there will be a turbulent flow zone at the inlet end of tube 12. The length of this zone can be approximated by conventional fluid dynamic equations. However, if a precise measurement of settling rates is desired, it is usually preferable to determine the point where settling begins by observation. Little, if any, settling occurs until the fluid flow is converted from turbulent to laminar because the random convection currents present in turbulent flow redistribute any particles that tend to settle.

The turbulent flow zone at the inlet end of tube 12 simulates the conditions present in most rapid tube settlers. Thus, this tester not only shows how fast a particle settles, but also shows how long it takes for settling to begin. Also, this tester simulates the self-flushing action of a tube settler, i.e., the flow of settled particles along the bottom side of the tube back to tank 10, and the tendency of this descending stream of settled particles to restrict the flow of fluid up the tube. Thus, this tester gives a much more complete and accurate picture of the conditions in a tube settler than a jar test can.

Preferably, the inclined tube 12 is made of a transparent material and a scale 16 is attached to or marked on the side of the tube. Thus, the maximum distance traveled by any particular type of particle, and the settling rate for that particle, can be determined.

The flow rate up through the tube is preferably adjusted so that little or none of the particulate matter passes out through the upper end of the tube. Thus, none of the particles have to travel through the pump; which minimizes the damage to the particles and helps to insure that the test conditions accurately reflect the conditions which are likely to be present in a tube settler. A variety of other steps may be taken to promote accurate results. For example, the fluid may be heated at some point in the cycle to the temperatures which are likely to be present in a tube settler. Also, the flow rate through the tube and the size, shape and angle of inclination of the tube may be varied to simulate a variety of different tube settlers. Thus, this invention provides a simple way for simulating on a small scale the conditions which are present in the actual separator.

The fluid and the particulate matter for the test may be provided in a variety of ways. For example particles may be produced in a standard jar test and then transferred to tank 10. Alternatively, the waste to be treated and the chemicals to be added may be mixed in the tank 10 and allowed to coagulate until the sludge particles form, then the pump 13 can be started to suck a mixture of the fluid and the sludge particles up the tube 12.

Another method of supplying the material to be tested is to withdraw a sample from a separator. FIGS. 2 and 3 illustrate an embodiment of this invention utilizing this method of providing the sample. In this embodiment, an inclined tube 22 is used to monitor and control the operation of a precipitator 23 equipped with a bank of inclined tubes 27. In this installation, the fluid to be treated, such as waste water, is added through line 24 and mixed in a flocculation zone 26 with flocculants, coagulants, or the like supplied through one or more chemical feed lines 25. The fluid and chemicals form sludge particles 17 which settle out of the fluid as it passes up through a number of small inclined tubes 27, such as those shown in the aforementioned patents, patent application and technical bulletins. Typically the angle of the tubes is great enough so that the particles slide back along the lower sides of the tubes to a sludge blanket zone. One or more blowdown lines 28 are provided through which the sludge particles may be removed either periodically or continuously.

Precipitator 23 is provided with one or more lines 29 for withdrawing samples. In the system shown in FIGS. 2 and 3, the samples are taken from the sludge blanket zone of the precipitator; however, in some instances it may be desirable to take the samples from other locations, such as the coagulation zone 26, the tubes 27, or the clarified water zone at the discharge end of the tubes.

A mixture of fluid and particulate matter is transferred through sample line 29 to a container 30 into which the lower end of the inclined tube 22 extends. As is best shown in FIG. 3, line 29 is tangentially connected to the cylindrical upper portion of container 30. As a result, the incoming fluid agitates the mixture in the container and helps insure that a representative sample passes into the inclined tube 22. Of course, a variety of other types of agitation may be employed. For example, a mechanical or magnetic stirrer such as is shown in FIG. 1 may be used, or the sample from the precipitator may be fed into the bottom of container 30.

From container 30 the fluid passes up through the inclined tube 22 at a rate which simulates the rate at which fluid passes through tubes 27 in the precipitator. Generally, it is preferable to use a tube that is identical in size, shape and inclination to the tubes 27 in the precipitator and pass the fluid through tube 22 at the same flow rate; however, in some instances variations in one or more of these parameters may be desirable.

As the fluid passes up through the tube 22 the sludge particles in the fluid settle to the lower side of the tube and flow back down into container 30, from which they may be removed through blowdown line 31. Alternatively, if the fluid and particulate matter are thoroughly mixed in container 30 and the fluid passing through the tube is returned to the container, as in FIG. 1; the excess sludge particles may be removed from the container by providing an overflow opening in or near the top of the container.

In the system shown in FIGS. 2 and 3, fluid is sucked up through tube 22 and through a rotameter 32 by a syphon tube 33. If container 30 is closed, the syphon tube may be omitted and the pressure in container 30 may be used to force fluid up through tube 22. However, in most cases, it is preferable to provide flow control means, such as the syphon tube or a pump like the one shown in FIG. 1, at the discharge end of tube 22 so that the flow rate through the tube may be adjusted. This makes it easier to simulate in tube 22 the conditions existing in the tubes 27 in precipitator 23, so that the precipitator may be controlled automatically by providing sensors to detect sludge particles 17 at one or more levels in tube 22.

In the illustrated system, particles are detected in tube 22 by photocells. Tube 22 is made of a transparent material. One or more lights 34 are positioned on one side of the tube and one or more photocells 35, 36 are positioned on the opposite side. The photocells are connected to a controller 37 that regulates, through pumps 38, the rate at which the various chemicals are fed to the precipitator 23. Thus, the operation of the precipitator can be automatically controlled without installing any sensors in the tube settler itself. Consequently, the sensors and controls can be placed in a location where they can be easily monitored. Furthermore, locating tube 22 outside the precipitator makes it easier to keep it clean, which helps prevent erroneous signals from the photocells.

While we have described our invention in connection with the separation of sludge particles from water; it is equally applicable to the testing and/or monitoring of the separation of other types of particulate matter, including liquid particles such as droplets of mercury or oil, from any fluid having a different specific gravity. In some cases, such as the separation of oil droplets from water, the particulate matter may be lighter than the fluid. In such a case, the mixture of fluid and particulate matter enter the inclined tube at the top and the particulate matter returns to the top of the tube while the clarified fluid passes out through the bottom of the tube.

It should also be clear that this invention may be used to monitor and/or control the operation of many other types of separators, with and without tube settlers. These, and many other modifications may be made to the embodiments described above within the scope of this invention, which is defined by the appended claims.

We claim:

1. A method for measuring the settling rate of particulate matter in a fluid comprising:
   a. providing a vessel containing a mixture of said particulate matter and said fluid;
   b. providing an inclined tube having a lower end extending into the fluid in the vessel and an upper end extending above the level of the fluid in the vessel;
   c. sucking fluid from the vessel up through the inclined tube at a known flow rate within the laminar flow range; and
   d. measuring the distance particulate matter travels up the tube.

2. A method according to claim 1 wherein the fluid is sucked up through the tube by a positive displacement pump having its inlet hydraulically connected to the upper end of the inclined tube.

3. A method according to claim 1 wherein the fluid is sucked up through the tube by a syphon hydraulically connected to the upper end of the inclined tube.

4. A method for controlling a separator in which fluid flows through a number of inclined tubes, whereby particulate matter settles out of the fluid in the tubes, comprising:
   a. providing an inclined control tube located outside the separator;
   b. withdrawing a mixture of fluid and particulate matter from said separator and passing said mixture through said inclined control tube at a rate that simulates the rate at which fluid passes through the tubes in said separator, whereby said particulate matter settles out of the fluid in said inclined control tube;
   c. providing means for sensing the presence of particulate matter at at least one level in the inclined control tube; and
   d. controlling the separator in response to signals produced by said sensing means.

5. A method according to claim 4 wherein the flow rate through the inclined control tube is controlled by a syphon tube hydraulically connected to the outlet end of said inclined control tube.

6. A method according to claim 4 wherein the flow rate through the inclined control tube is controlled by a positive displacement pump hydraulically connected to the outlet end of the inclined control tube.

* * * * *